United States Patent
Watasue

(10) Patent No.: US 7,930,132 B2
(45) Date of Patent: Apr. 19, 2011

(54) TIRE ROTATION DETECTION SYSTEM AND METHOD

(75) Inventor: Toshiaki Watasue, Kanagawa-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 87 days.

(21) Appl. No.: 12/364,761

(22) Filed: Feb. 3, 2009

(65) Prior Publication Data
US 2009/0204361 A1 Aug. 13, 2009

(30) Foreign Application Priority Data
Feb. 4, 2008 (JP) .................. 2008-023719

(51) Int. Cl.
*G01P 15/00* (2006.01)
*B60C 23/00* (2006.01)

(52) U.S. Cl. .............. 702/148; 702/141; 340/444

(58) Field of Classification Search .......... 702/141, 702/148
See application file for complete search history.

(56) References Cited

U.S. PATENT DOCUMENTS

| 5,526,263 | A | 6/1996 | Tanaka et al. |
| 6,259,361 | B1 | 7/2001 | Robillard et al. |
| 2007/0112475 | A1* | 5/2007 | Koebler et al. ............ 701/1 |
| 2008/0030314 | A1 | 2/2008 | Watabe |

FOREIGN PATENT DOCUMENTS
WO   WO 2005106422   11/2005

* cited by examiner

*Primary Examiner* — Drew A Dunn
*Assistant Examiner* — Jonathan C Teixeira Moffat
(74) *Attorney, Agent, or Firm* — John J. Patti; Wade J. Brady, III; Frederick J. Telecky, Jr.

(57) ABSTRACT

A method for determining whether a tire is in rotation is provided. A measured acceleration is compared to a first threshold after a first timer indicates that a first period has lapsed, and indication that the tire is in rotation is provided if at least one of the measured accelerations is greater than the first threshold. If an absolute difference between consecutive measured accelerations is greater than a second threshold, an indication that the tire is in rotation is also provided. Additionally, the second timer is started if the absolute difference is greater than the second threshold and if a second timer is not running, and indication that the tire is rotating is provided if the absolute difference is less than a predetermined threshold and if the second timer is running.

13 Claims, 5 Drawing Sheets

TIRE ROTATION DETECTION SYSTEM AND METHOD

CROSS-REFERENCE TO RELATED APPLICATIONS

This application claims priority to Japanese Patent Application Ser. No. 2008-023719, entitled "Tire Rotation Detector, Tire Rotation Detecting Method and Tire Monitoring Device," filed on Feb. 4, 2008, which is hereby incorporated by reference for all purposes.

TECHNICAL FIELD

The invention relates generally to monitoring the state of a tire and, more particularly, to detecting whether a tire is substantially in rotation.

BACKGROUND

Recently, practical applications of TPMSs or Tire Pressure Monitoring Systems have attracted much attention. Generally speaking, TPMSs can be classified into two categories: direct measurement and indirect measurement. In a direct measurement TPMS, the pneumatic pressure of each tire is individually measured, and in an indirect measurement TPMS, pneumatic pressure is detected from a difference in the rotation speed between two wheels. Usually, with these TPMS systems, a sensor module or unit is mounted within each tire, communicates with on-board electronics mounted with the automobile or to the body of the automobile through wireless or radio frequency (RF) transmissions.

One aspect of the TPMS is a determination of whether the tire is in rotation. Turning to FIGS. 1 through 4 of the drawings, a convention method and/or system for measuring the tire rotation is shown.

In operation (as shown in FIGS. 1 and 2), a sensor module or unit 100 is secured within a tire 102 at a predetermined location, such as the stem of tire 102. When sensor module 100 rotates together with wheel 104 and tire 102 of the automobile, in accelerator sensor or accelerometer 106 incorporated within sensor module 100, centrifugal force $F_C$ acts in the radial direction or normal direction (where center O is the axis of rotation) on accelerometer 106, while the force of gravity $F_G$ acts in the vertical direction. As a result of the rotation about center O, a corresponding normal force $F_N$ (centrifugal force $F_C$ and radial component $F_G \sin \theta$ of force of gravity $F_G$) is output. Here, assuming that the mass of the movable portion of accelerometer 106 is m, the rotation speed of tire 102 is f (cycles/sec), the time is t and r is the radial distance of the sensor from the axis of rotation O, the instantaneous value of normal acceleration A is represented by following equation:

$$A = \frac{F_N}{m} \quad (1)$$
$$= \frac{F_C + mg\sin\theta}{m}$$
$$= \frac{mr(2\pi f)^2 + mg\sin(2\pi ft)}{m}$$
$$= r(2\pi f)^2 + g\sin(2\pi ft)$$

If the radius of tire 102 is R and the traveling speed of the vehicle is v and rotation speed f have the relationship expressed by equation (2) below.

$$f = \frac{v}{2\pi R} \quad (2)$$

By substituting equation (2) into equation (1), one can convert to a function of speed v as shown in following formula (3).

$$A = r\left(\frac{v}{R}\right)^2 + g\sin\left(\frac{vt}{R}\right) \quad (3)$$
$$= C_1 v^2 + g\sin(C_2 vt),$$
$$\text{where } C_1 = \frac{r}{R^2} \text{ and } C_2 = \frac{1}{R}.$$

Now turning to FIG. 3, the waveform of normal acceleration A represented by equation (3) is shown. As shown, normal acceleration A varies over time with a sine waveform having a central level corresponding to centrifugal acceleration $F_C/m$ or $C_1 * v^2$ and a peak-to-peak value corresponding to acceleration due to gravity g. Waveform AM shows the waveform of normal acceleration A when running speed v is low (near zero) so that the first term of equation (3) can be ignored, and it can be approximately by the second term of equation (3).

As can be seen from FIG. 3, when the automobile starts from a stop state and the running speed rises, for the waveform of normal acceleration A with period T (1/f), central level corresponding to centrifugal acceleration $F_C/m$ or $C_1 * v^2$ rises in proportion to the square of v, which causes the peak of acceleration A to rise by the same amount. Consequently, by setting threshold Th higher than gravity acceleration g by an appropriate value h, it is possible to judge whether the automobile has substantially entered the running state by detecting whether normal acceleration A exceeds threshold Th.

However, precise and stable detection of the tire rotation at a low speed is difficult with conventional systems. As an example, assume that tire 102 has radius R of 0.35 m, rotating radius r of accelerometer 106 is 13 inches (about 0.33 m), and the automobile runs at a low speed of about 4 km/h. For normal acceleration A, the central level ($C_1 * v^2$) is about 0.2-g or about 1.962 m/s$^2$, period T (1/f) is about 1.8 s, and the waveform is a sine waveform as shown in FIG. 4. Waveform AM represented by a dot-dash line is the waveform when the automobile is at a very low speed immediately after start. In order to detect the change from waveform AM to the solid line waveform (at a speed of 4 km/h) A, one may set threshold Th close to 1.1 g or about 10.791 m/s$^2$. In the FIG. 4, $A_0$ through $A_7$ represent measurement values (sample values) of normal acceleration A obtained at an interval of a predetermined time (e.g., 0.1 s) based on the output signal of accelerometer 106.

As can be seen from FIG. 4, when running at a speed of 4 km/h, measured value $A_i$ of normal acceleration A is over threshold Th only when it is near the maximum peak value in 1 cycle (only a few rounds among the 18 sampling period), and reliable detection of rotation is difficult. Also, if a dispersion of about ±15° exists for the attachment precision of sensor module 100 or accelerometer 106, an error of about 0.04-g or about 0.392 m/s$^2$ is generated in normal acceleration A. As a result, in this example, in order to ensure effective use of threshold Th of 1.1-g, the measurement error of accelerometer 106 must be smaller than 0.06-g or about 0.589 m/s$^2$, and precision in absolute value is difficult to guarantee even if an expensive high performance sensor is used.

Some examples of convention systems and/or methods are: U.S. Pat. No. 5,526,263; U.S. Pat. No. 6,259,361; U.S. Patent Pre-Grant Publ. No. 2008/0030314; and PCT Publ. No. WO2005/106422.

SUMMARY

A preferred embodiment of the present invention, accordingly, provides an apparatus. The apparatus comprises a first timer that indicates when a first period has lapsed; a second timer that operates for a second period; an accelerometer that measures an acceleration of a tire after each first period has lapsed; and a processor having a computer program embodied thereon. The computer program includes computer code for indicating that the tire is in rotation if at least one of the measured accelerations is greater than a first threshold; computer code for indicating that the tire is in rotation if an absolute difference between consecutive measured accelerations is greater than a second threshold; computer code for starting the second timer if the absolute difference is greater than the second threshold and if the second timer is not running; and computer code for indicating that the tire is rotating if the absolute difference is less than a predetermined threshold and if the second timer is running.

In accordance with a preferred embodiment of the present invention, the apparatus further comprises a radio frequency (RF) output device that communicates information from the processor.

In accordance with a preferred embodiment of the present invention, the apparatus further comprises a pneumatic pressure sensor that measured a tire pressure.

In accordance with a preferred embodiment of the present invention, the apparatus further comprises a battery that supplies power to the apparatus.

In accordance with a preferred embodiment of the present invention, the apparatus further comprises a battery voltage sensor that measures the voltage of the battery.

In accordance with a preferred embodiment of the present invention, the computer program further comprises computer code for indicating that the tire is not in rotation if the absolute difference is less than the second threshold and the second timer is not running.

In accordance with a preferred embodiment of the present invention, a system is provided. The system comprises a radiator; a receiver that is mounted in the body of a vehicle and that is coupled to the radiator; a plurality of sensing unit, wherein each sensor is secured to at least one tire of the vehicle. Each sensing unit includes a first timer that indicates when a first period has lapsed; a second timer that operates for a second period; an accelerometer that measures the an acceleration of a tire after each first period has lapsed; a processor having a computer program embodied thereon; and an RF output device that is coupled to the processor and that communicates information from the processor to the radiator. The computer program includes computer code for indicating that the tire is in rotation if at least one of the measured accelerations is greater than a first threshold; computer code for indicating that the tire is in rotation if an absolute difference between consecutive measured accelerations is greater than a second threshold; computer code for starting the second timer if the absolute difference is greater than the second threshold and if the second timer is not running; and computer code for indicating that the tire is rotating if the absolute difference is less than a predetermined threshold and if the second timer is running.

In accordance with a preferred embodiment of the present invention, the system further comprises a display that is coupled to the receiver.

In accordance with a preferred embodiment of the present invention, the radiator is an antenna.

In accordance with a preferred embodiment of the present invention, a processor having a computer program for determining whether a tire is in rotation embodied thereon. The computer program comprises computer code for comparing a measured acceleration to a first threshold after a first timer indicates that a first period has lapsed; computer code for indicating that the tire is in rotation if at least one of the measured accelerations is greater than the first threshold; computer code for indicating that the tire is in rotation if an absolute difference between consecutive measured accelerations is greater than a second threshold; computer code for starting the second timer if the absolute difference is greater than the second threshold and if a second timer is not running; and computer code for indicating that the tire is rotating if the absolute difference is less than a predetermined threshold and if the second timer is running.

In accordance with a preferred embodiment of the present invention, wherein the computer program further comprises computer code for receiving a measured tire pressure from a pneumatic pressure sensor.

In accordance with a preferred embodiment of the present invention, the computer program further comprises computer code for receiving a measured voltage of a battery from a battery voltage sensor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
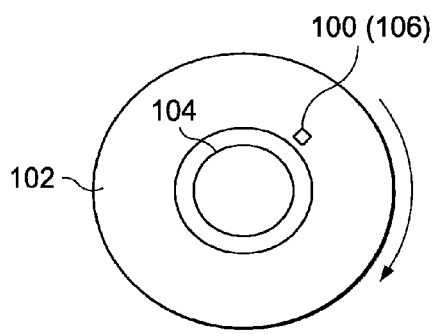
FIG. 1 is a diagram illustrating a sensor module that is secured to a tire.
Figure 2:
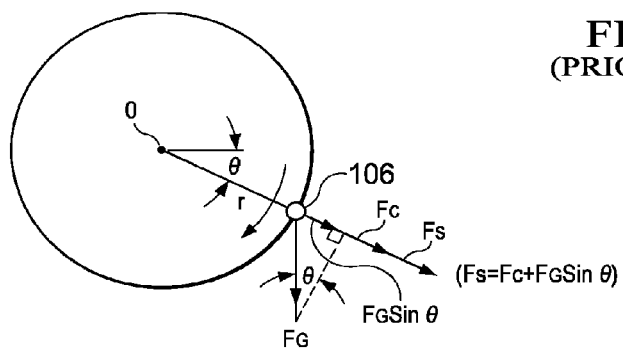
FIG. 2 is a diagram illustrating the forces acting on the sensor module.
Figure 3:
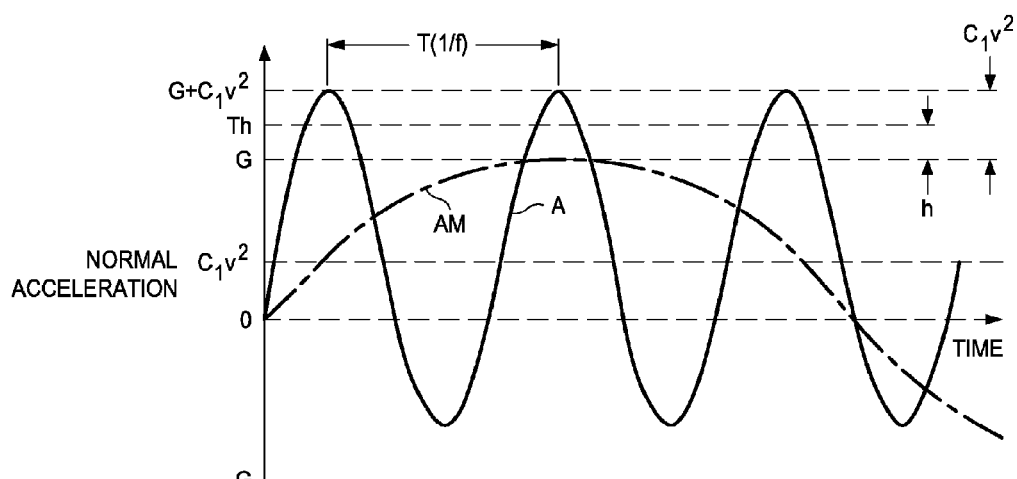
FIG. 3 is a diagram illustrating a conventional tire rotation detecting method.

Refer now to the drawings wherein depicted elements are, for the sake of clarity, not necessarily shown to scale and wherein like or similar elements are designated by the same reference numeral through the several views.

Figure 5:
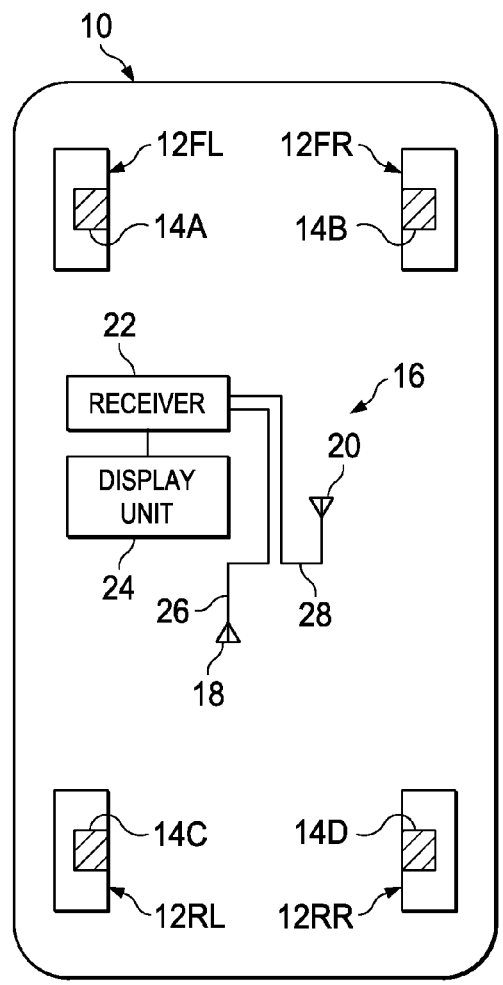
FIG. 5 is a block diagram illustrating a TPMS as used in a vehicle or automobile in accordance with a preferred embodiment of the present invention.

Referring to FIG. 5 of the drawings, the reference numeral 10 generally designates a vehicle or automobile that implements a TPMS in accordance with a preferred embodiment of the present invention. The TPMS is generally comprised of a wireless or radio frequency (RF) system (preferably for use in a direct measurement system). The sensor units or modules 14A, 14B, 14C, and 14D secured to tires 12FL, 12FR, 12RL, and 12RR (respectively) and generally comprise the "transmission side" of the system, while unit 16 (which is installed or carried within or on body on automobile 10) generally comprises the "receiver side" of the system.

Each sensor module 14A through 14D generally includes various types of sensors for detecting the acceleration, pneumatic pressure, temperature of the tire, battery voltage, and so forth, and a transmitter for wireless transmission of the various types of measured values and other information is also included. Typically, the sensor units 14A through 14D are secured in the stem of a tire (such as tires 12FL to 12 RR), and electromagnetic waves or RF signals can be used by sensor units 14A through 14D to transmit tire state information to unit 16.

Unit 16 generally comprises two receiving radiators or antennas 18 and 20, a receiver 22, and display unit 24. The two receiving antennas 18 and 20, for example, are generally secured to the bottom of the body in the rectangular frame connecting the four wheels FL, FR, RL, and RR of automobile 10 such that they can receive between them the electromagnetic waves sent from said sensor modules 14A through 14D with a predetermined phase difference. Receiver 22 is connected through power feed lines 26 and 28 to receiving antennas 18 and 20, respectively, and may be set at any site within or on the body of the automobile 10. Display unit 24 may be comprised of a liquid crystal display (LCD), light emitting diodes (LEDs), or any other display device or display element, and it is usually set in front of the driver's seat in the cab of the automobile 10. For example, receiver 22 can include a signal processor containing a CPU (central processing unit) or DSP (digital signal processor). Based on the phase difference of the electromagnetic waves received by receiving antennas 18 and 20, the tire 12FL to 12RR is determined, and the tire ID information and the tire state information (i.e., pneumatic pressure measured value, temperature measured value, battery voltage measured value, etc.) are compared with respective monitor reference values (i.e., reference pneumatic pressure, reference temperature, reference voltage, etc.). Based on these comparisons, a determination as to whether the tire 12FL to 12RR is operating properly can be made. The result can then be displayed on display unit 24 for the user (driver).

Figure 6:
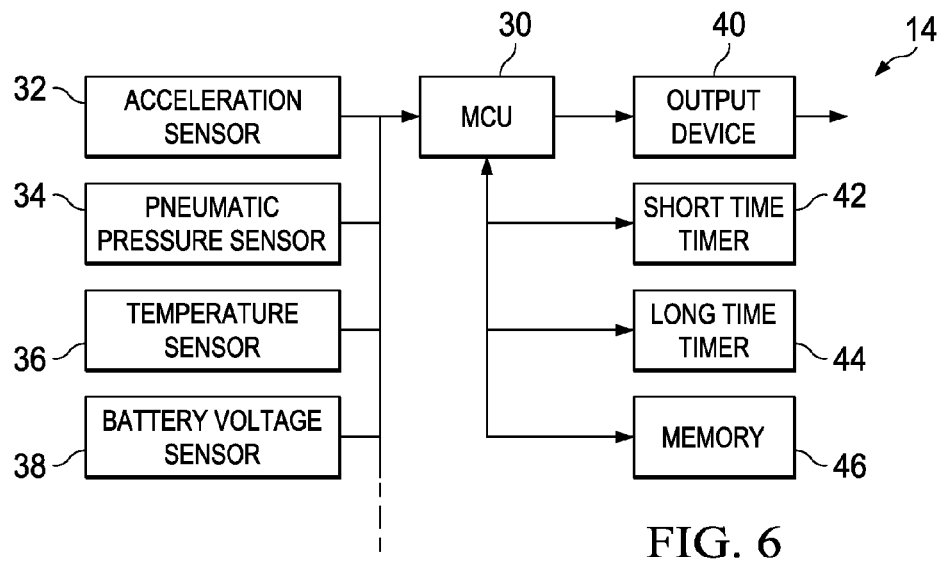
FIG. 6 is a block diagram sensor module or unit in accordance with a preferred embodiment of the present invention.

Now turning to FIG. 6, an example sensor unit module 14A through 14D (hereinafter 14) is shown. Here, MCU (controller unit) 30 receives information from the various types of sensors, which can include accelerometer 32, pneumatic pressure sensor 34, temperature sensor 36, and battery voltage sensor 38. The MCU 30 can also perform signal processing and can send information to receiver 22 of FIG. 1 through output device 40. The information transmitted by output device 40 is carried on electromagnetic waves at a predetermined frequency (e.g., 315 MHz). Accelerometer 32 may be a Microelectromechanical Systems (MEMS) accelerometer, piezoelectric, or other type of accelerometer. Generally, accelerometer 32 outputs an electric signal (normal acceleration measured value signal) representing normal acceleration A corresponding to the force received in the normal direction $F_N$ (which is generally the sum of centrifugal force $F_C$ and radial component $F_G \sin \theta$ of the force of gravity $F_G$).

As shown, sensor module 14 can include short time timer 42, long time timer 44, and memory 46 corresponding to the tire rotation detection function. Preferably, short time timer 42 comprises a counter that continually counts a clock at a predetermined frequency and can indicate whether a time period $T_S$ has lapsed. Short time timer 42 generally sends timing signals or indications to read the output signal (measured value of normal acceleration A) of accelerometer 32 at predetermined intervals (after each period $T_S$ has lapsed) to MCU 30. Long-time timer 44 generally begins counting when a comparison result indicating that the absolute value of the difference of consecutive accelerations or absolute difference $\delta A_i$ is larger than the low speed threshold is output from MCU 30 and indicates when a period $T_L$ has lapsed following a comparison result. Preferably, long time timer 44 may be comprised of a counter that counts the clock at a predetermined frequency or timing pulses output from the short time timer 42 indicating that period $T_S$ has lapsed. Preferably, memory 46 temporarily stores data for use in the signal processing of MCU 30 and data of the processing result.

Figure 7:
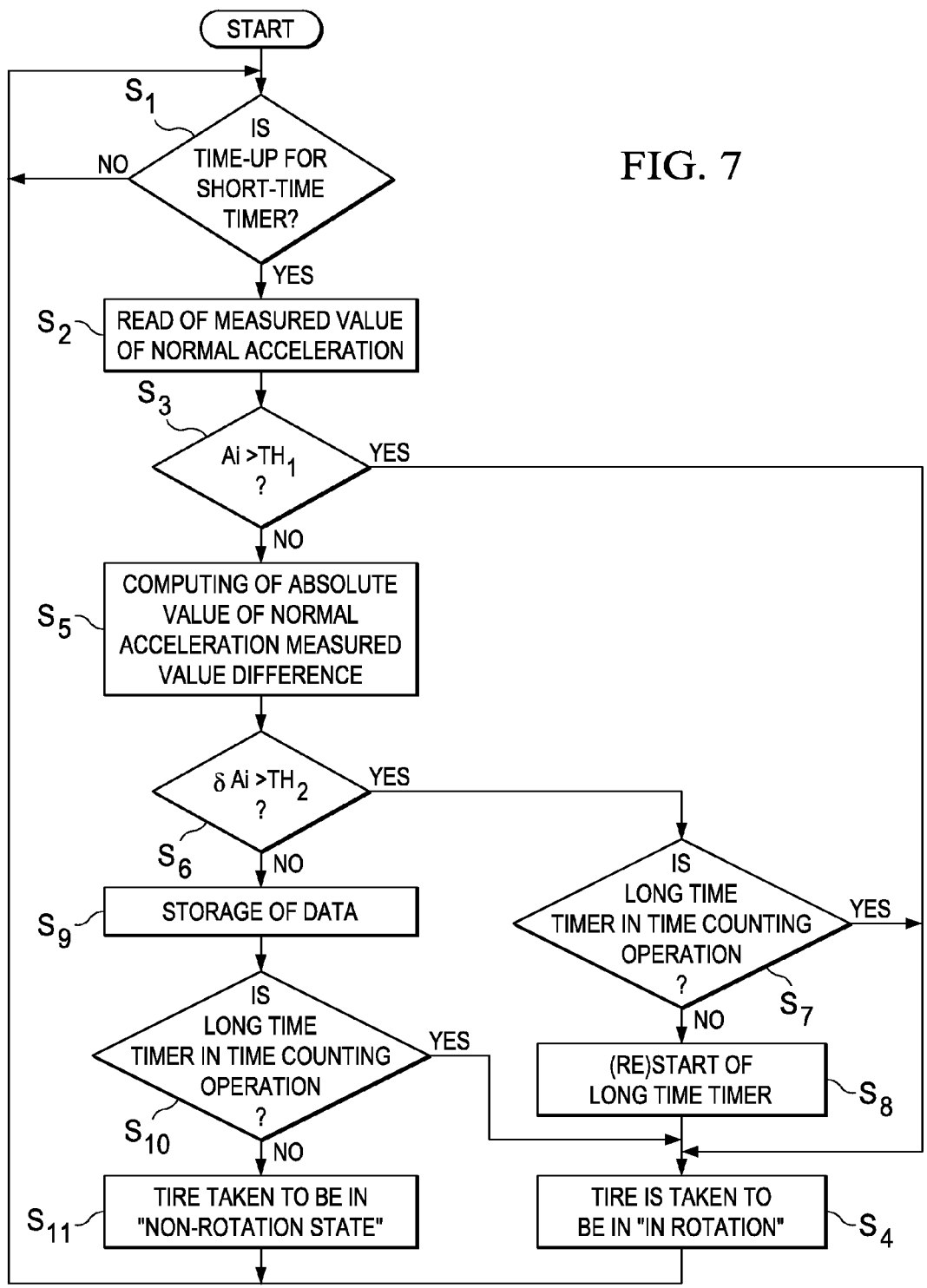
FIG. 7 is a flow chart illustrating the a method of detecting tire rotation in accordance with a preferred embodiment of the present invention.

FIG. 7 is flow chart depicting an example of the method carried out by the MPU 30 to determine whether a tire 12LF through 12RR (hereinafter 12) is in rotation. Preferably, this method is implemented through software or a computer program embodied on the MPU 30. For the following example, it is assumed that the counting time (cycle) $T_S$ of short time timer 42 is 0.1 s, the counting time $T_L$ of long time timer 44 is 1 s, threshold $TH_1$ of the high speed region is 2.5-g or about 24.53 m/s², threshold $TH_2$ of the low speed region is 0.2-g or about 1.96 m/s₂, radius R of tire 12 is 0.35 m and radial displacer of accelerometer 32 from the axis of rotation O is 13 in (about 0.33 m).

In a first example, it can be assumed that automobile 10 is traveling at low speed of about 4 km/h or 1.11 m/s. As a result, with the same sine waveform (or cosine waveform) as that shown in FIG. 4, an electrical signal (signal of measured value of normal acceleration) representing normal acceleration A is output from accelerometer 32. MCU 30 retrieves the output signal of accelerometer 32 after each period $T_S$ (0.1 s) indicated by short time timer 42 (step $S_1$). The measured value $A_i$ of normal acceleration A is read, and read measured value $A_i$ of the normal acceleration is stored in memory 46 (step $S_2$). Then, MCU 30 compares the measured value $A_i$ of the normal acceleration with threshold $TH_1$ of the high speed region (step $S_3$). If the measured acceleration $A_i$ is greater than the threshold $TH_1$ ($A_i > TH_1$), tire 12 is taken to be in rotation (step $S_3 \rightarrow S_4$). However, when automobile 10 is traveling at a speed of about 4 km/h, the measured value $A_i$ of normal acceleration is within the range of less than the threshold $TH_1$ (not within the 2.5-g region).

Figure 8:
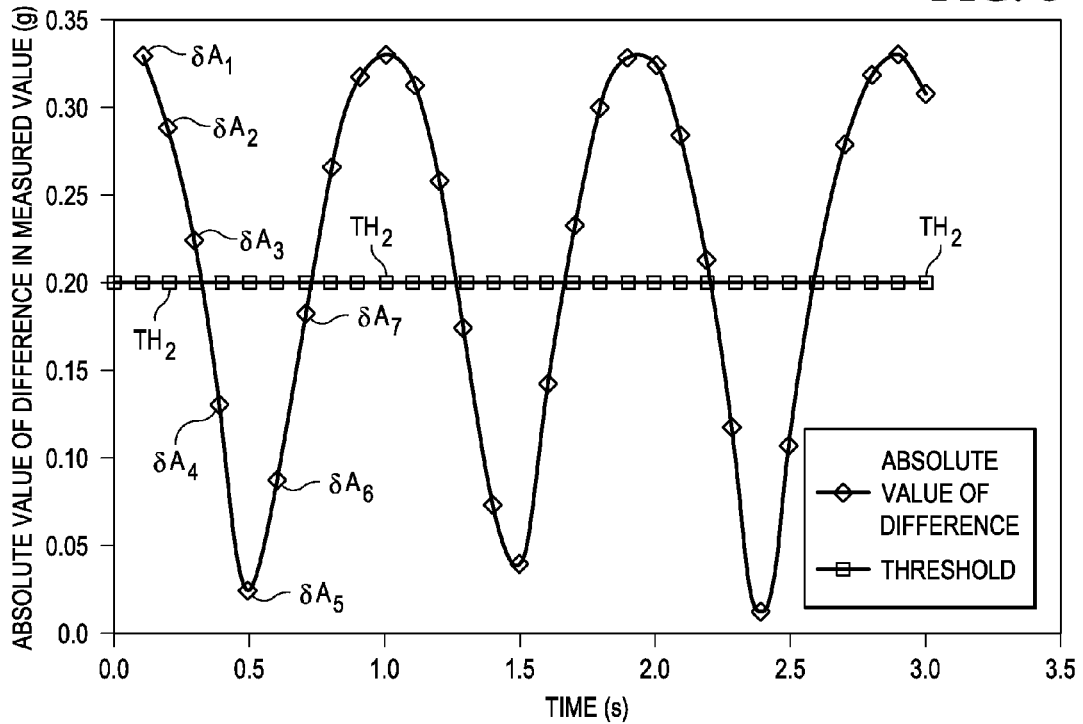
FIG. 8 is a diagram illustrating the waveform of the absolute difference obtained for each cycle with low speed (at about 4 km/h) in accordance with a preferred embodiment of the present invention.

When it is determined that the measured value $A_i$ of normal acceleration is less than threshold $TH_1$, MCU 30 can compute the absolute difference $\delta A_i$ of measured accelerations of two consecutive periods $T_S$ or $\delta A_i=|A_{i-1}-A_i|$ (step $S_5$). FIG. 8 shows the waveform of absolute differences $\delta A_i$ obtained in each cycle when automobile 10 travels at a speed of about 4 km/h.

MCU 30 can then compare the absolute difference $\delta A_i$ with threshold $TH_2$ of the low speed region (step $S_6$). If the absolute difference $\delta A_i$ is less than the threshold $TH_2$ ($\delta A_i>TH_2$), tire 12 is taken to be in rotation (step $S_6 \rightarrow S_4$). In this case, MCU 30 determines whether long time timer 44 is performing a time counting operation or is running (step $S_7$). If the long time timer 44 is running, the operation of the long time timer 44 is continued (step $S_7$). On the other hand, if the long time timer 44 is not running, long time timer 44 is started (step $S_8$). As another scheme that may be adopted, when the absolute difference $\delta A_i$ is greater than $TH_2$ (independent of whether long time timer 44 is in a time counting operation), long time timer 44 can be started or restarted in any case at this time point; this scheme generally provides a stable timer function. Now turning back to FIG. 8, an example can be seen with the automobile or vehicle 10 traveling at 4 km/h. Each of the absolute differences $\delta A_1$, $\delta A_2$ and $\delta A_3$ is greater than $TH_2$, so, during this period, the tire 12 is determined to be in rotation and the long time timer 44 is started and/or continued.

When comparison between absolute difference $\delta A_i$ is less than threshold $TH_2$ (step $S_6$), MCU 30 stores the desired data (step $S_9$), and checks whether long time timer 44 is performing a time counting operation or is running (step $S_{10}$). In this case, when long time timer 44 is still performing a time counting operation, tire 12 is taken to be in rotation (step $S_{10} \rightarrow S_4$). However, when long time timer 44 is no longer running (when the period $T_L$ has lapsed), tire 12 is taken to not be in rotation (step $S_{10} \rightarrow S_{11}$). Turning back to FIG. 8, absolute differences $\delta A_4$ through $\delta A_7$ are each below threshold TH2, but the long time timer 44 (operated for a period $T_L$ of 1 s) continues to run during the elapsed time for each of the absolute differences $\delta A_4$ through $\delta A_7$; thus, the tire is determined to be in rotation for the elapsed time for each of the absolute differences $\delta A_4$ through $\delta A_7$. That is, in the running state at a speed of 4 km/h, the rotation of tire 12 can be reliably detected without error.

Figure 4:
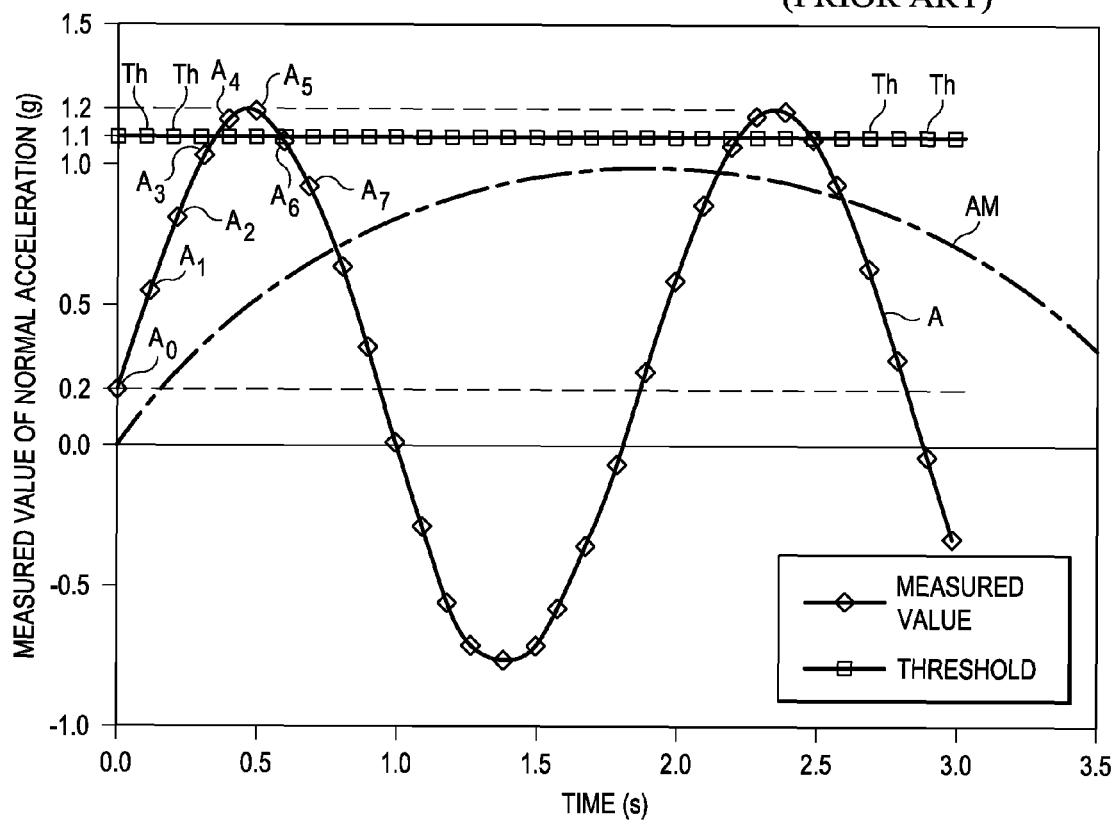
FIG. 4 is a diagram illustrating the waveform of the measured value of normal acceleration obtained with an acceleration sensor in low speed rotation (about 4 km/h) and application of a conventional tire rotation detecting method.

Also, it is preferred that the level be set such that the time when absolute difference $\delta A_i$ be obtained when tire 12 rotates at a speed near the monitoring speed in the low speed region (e.g., 4 km/h) is higher than threshold $TH_2$ and the time when it is lower than said threshold repeat at a certain period. It is more preferred, as shown in FIG. 4, that said level be set near the central level with respect to the waveform of absolute difference $\delta A_i$. Also, it is preferred that time counting time $T_L$ of long time timer 44 be set in the range of one half cycle to one cycle (about 0.9-1.8 sec) of normal acceleration A obtained when tire 12 rotates at a speed near the monitoring speed (4 km/h). Thus, once the absolute difference $\delta A_i$ is greater than threshold $TH_2$, the judgment result that tire 12 is in rotation can be continuously obtained until the point when the absolute difference falls below threshold $TH_2$ and the time-up state of long time timer 44 coincides in time (until the running speed reaches about 2 km/h or lower).

Figure 10:
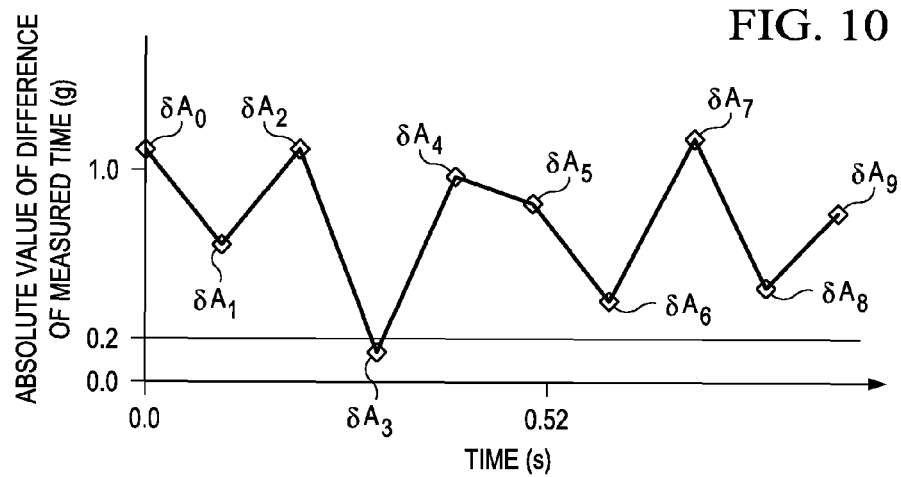
FIG. 10 is a diagram illustrating the waveform of the absolute difference obtained for each cycle based on the waveform of the measured value of the normal acceleration shown in FIG. 9.
Figure 9:
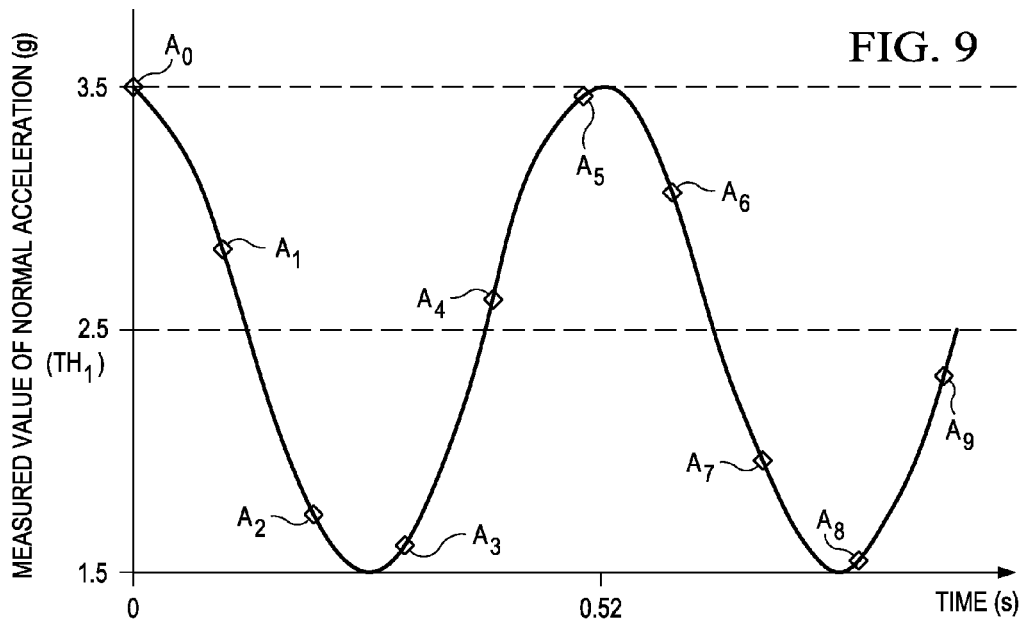
FIG. 9 is a diagram illustrating the waveform of the measured value of the normal acceleration obtained at a relatively high speed (about 14 km/h) in accordance with a preferred embodiment of the present invention.

Then, when the speed of automobile 10 is increased (e.g., to a centrifugal force $F_C$ in the 2.5-g region such that the speed is about 14 km/h), the waveform of measured value A of the normal acceleration is shown in FIG. 9, and the waveform of the absolute difference $\delta A_i$ is shown in FIG. 10. In this case, times in which normal acceleration measured value A is larger than threshold $TH_1$ and times when the value A is smaller than threshold $TH_1$ are repeated alternately. Looking to FIG. 9, points $A_0$, $A_1$, $A_4$, $A_5$, and $A_6$ are greater than threshold $TH_1$, and points $A_3$, $A_4$ $A_7$, $A_8$, and Ag are less than threshold $TH_1$. At points when the values $A_i$ are greater than threshold $TH_1$, the tire 12 is determined to be in rotation (step $S_3 \rightarrow S_4$). However, when values $A_i$ are less than $TH_1$, absolute differences and threshold $TH_2$ and/or long time timer 44 are used (steps $S_5$-$S_{10}$). Here, as can be seen from FIG. 10, for absolute difference $\delta A_i$, at almost all points, the absolute differences $\delta A_i$ are greater threshold $TH_2$, and it is clear that the time counting operation is continued while long time timer 44 is repeatedly restarted. That is, in this case of a speed of about 14 km/h, the determination that the tire 12 is in rotation is output.

Preferably, the level is set such that the times when normal acceleration measured value A obtained when tire 12 rotates at a speed near the monitoring speed in the high speed region (e.g., 14 km/h) is higher than threshold $TH_1$ and the times when it is lower than said threshold repeat at a certain period. It is more preferred, as shown in FIG. 5, that the level be set near the central level (2.5-g) with respect to normal acceleration measured value A.

Also, when centrifugal force $F_C$ is over 3.5-g (speed about 17 km/h), because the minimum peak value of normal acceleration measured value A is over threshold $TH_1$ of the high speed region (2.5-g), in value A is greater than the (step $S_3$) $TH_1$, so the tire is determined to be in rotation. Under these circumstances, long time timer 44 can be paused. Also, even with a value A near the threshold $TH_1$ and there is an error of about ±0.5-g, the function of detecting the tire rotation is generally not influenced.

Also, when absolute difference $\delta A_i$ periodically falls below threshold $TH_2$ of the low speed region, by means of the time counting operation of long time timer 44, an unstable operation state, in which although the tire 12 is actually in rotation but there are alternating determinations that the tire 12 is in rotation and not in rotation, can generally be prevented. As a result, frequent repeating of the operation mode and standby mode that would cause excessive power consumption of the battery can be prevented. Therefore, the measurement precision and reliability of the tire rotation detection function can be improved, and thus the reliability of sensor module 14 as well as the overall TPMS can be improved.

According to the tire rotation detector and tire rotation detecting method described above, precise and stable detection of tire rotation at low speeds is possible even with the use of a low precision accelerometers. Consequently, uninterrupted stable detection of tire rotation from the low speed region to the high speed region is possible. Also, with the tire monitoring device in accordance with a preferred embodiment of the present invention, because of the high performance tire rotation detector of the present invention, lower consumption of electric power and higher reliability can be realized.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a first timer that indicates when a first period has lapsed by counting a clock signal having a predetermined frequency and that outputs a plurality of timing pulses, wherein each timing pulse is output each time the first period lapses;
   a second timer that indicates when a second period has lapsed by counting the timing pulses from the first timer;
   an accelerometer that measures an acceleration of a tire after each first period has lapsed; and
   a processor having a computer program embodied thereon, the computer program including:
      computer code for indicating that the tire is in rotation if at least one of the measured accelerations is greater than a first threshold;
      computer code for indicating that the tire is in rotation if an absolute difference between consecutive measured accelerations is greater than a second threshold;
      computer code for starting the second timer if the absolute difference is greater than the second threshold and if the second timer is not running; and
      computer code for indicating that the tire is rotating if the absolute difference is less than the second threshold and if the second timer is running.

2. The apparatus of claim 1, wherein the apparatus further comprises a radio frequency (RF) output device that communicates information from the processor.

3. The apparatus of claim 1, wherein the apparatus further comprises a pneumatic pressure sensor that measured a tire pressure.

4. The apparatus of claim 1, wherein the apparatus further comprises a battery that supplies power to the apparatus.

5. The apparatus of claim 4, wherein the apparatus further comprises a battery voltage sensor that measures the voltage of the battery.

6. The apparatus of claim 1, wherein the computer program further comprises computer code for indicating that the tire is not in rotation if the absolute difference is less than the second threshold and the second timer is not running.

7. A system comprising:
   an electromagnetic radiator;
   a receiver that is mounted in the body of a vehicle and that is coupled to the radiator;
   a plurality of sensing units, wherein each sensor is secured to at least one tire of the vehicle, and wherein each sensing unit includes:
      a first timer that indicates when a first period has lapsed by counting a clock signal having a predetermined frequency and that outputs a plurality of timing pulses wherein each timing pulse is output each time the first period lapses;
      a second timer that indicates when a second period has lapsed by counting the timing pulses from the first timer;
      an accelerometer that measures an acceleration of a tire after each first period has lapsed;
      a processor having a computer program embodied thereon, the computer program including:
         computer code for indicating that the tire is in rotation if at least one of the measured accelerations is greater than the first threshold;
         computer code for indicating that a tire is in rotation if an absolute difference between consecutive measured accelerations is greater than a second threshold;
         computer code for starting the second timer if the absolute difference is greater than the second threshold and if the second timer is not running; and
         computer code for indicating that the tire is rotating if the absolute difference is less than the second threshold and if the second timer is running; and
      an RF output device that is coupled to the processor and that communicates information from the processor to the radiator.

8. The system of claim 7, wherein the system further comprises a display that is coupled to the receiver.

9. The system of claim 7, wherein the sensing unit further comprises a pneumatic pressure sensor that measured a tire pressure.

10. The system of claim 7, wherein the sensing unit further comprises a battery that supplies power to the apparatus.

11. The system of claim 10, wherein the sensing unit further comprises a battery voltage sensor that measures the voltage of the battery.

12. The system of claim 7, wherein the computer program further comprises computer code for indicating that the tire is not in rotation if the absolute difference is less than the second threshold and the second timer is not running.

13. The system of claim 7, wherein the electromagnetic radiator is an antenna.

* * * * *